Dec. 1, 1953  C. G. HOLSCHUH ET AL  2,660,793
STABILIZED TRACKING AND FIRE CONTROL SYSTEM
Filed May 22, 1942  7 Sheets-Sheet 2
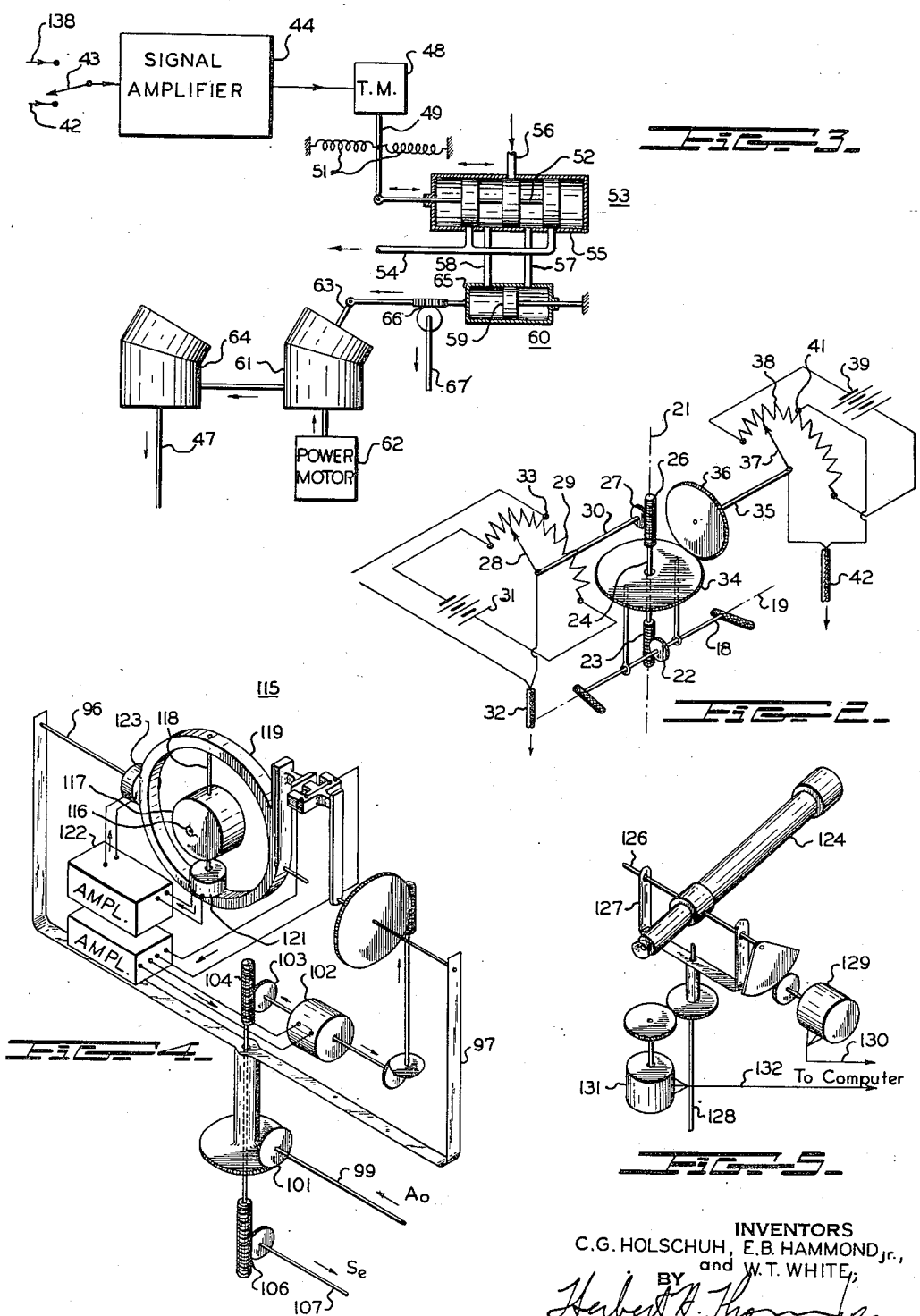
INVENTORS
C.G. HOLSCHUH, E.B. HAMMOND Jr.,
and W.T. WHITE,
BY Herbert H. Thompson
THEIR ATTORNEY

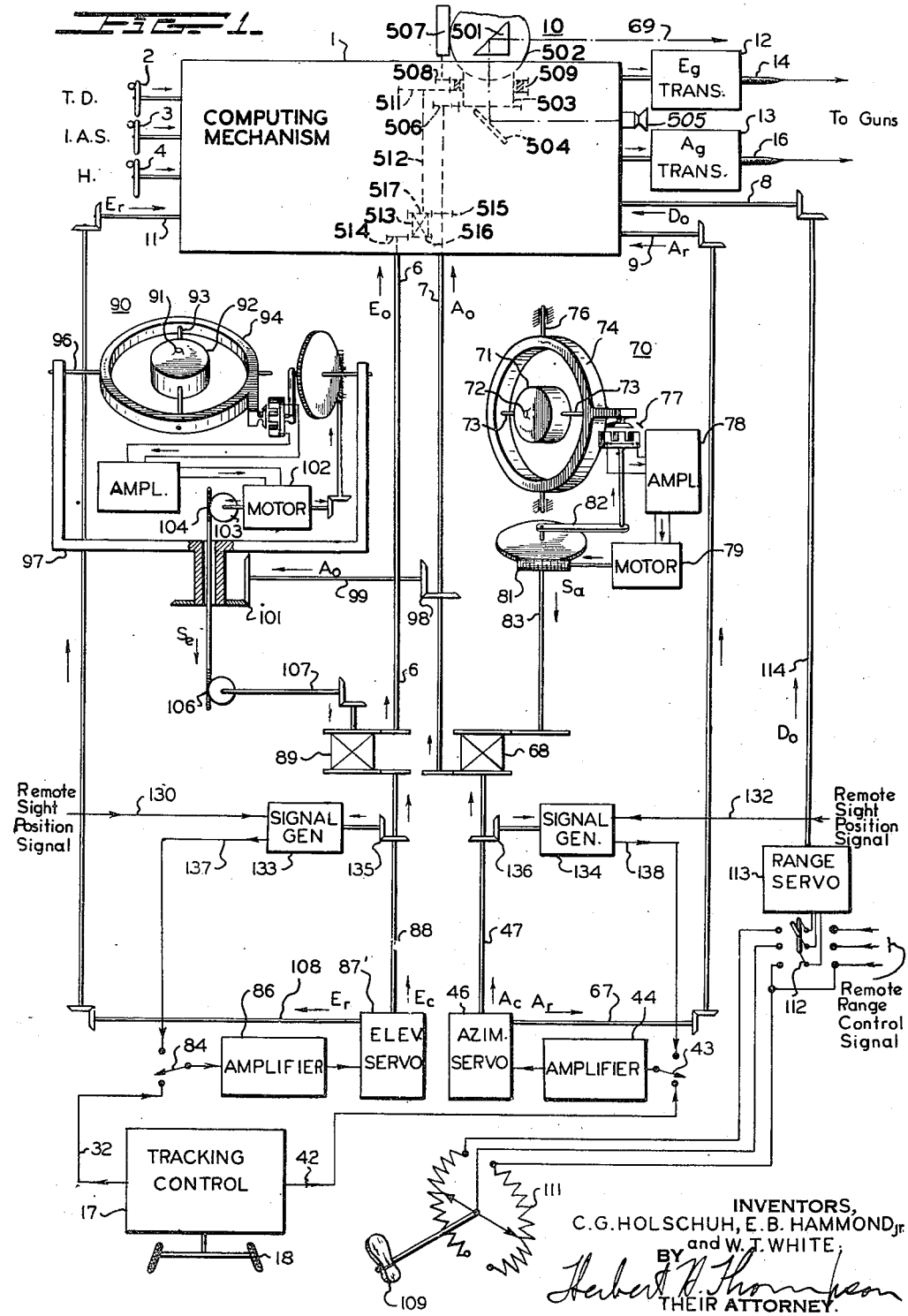

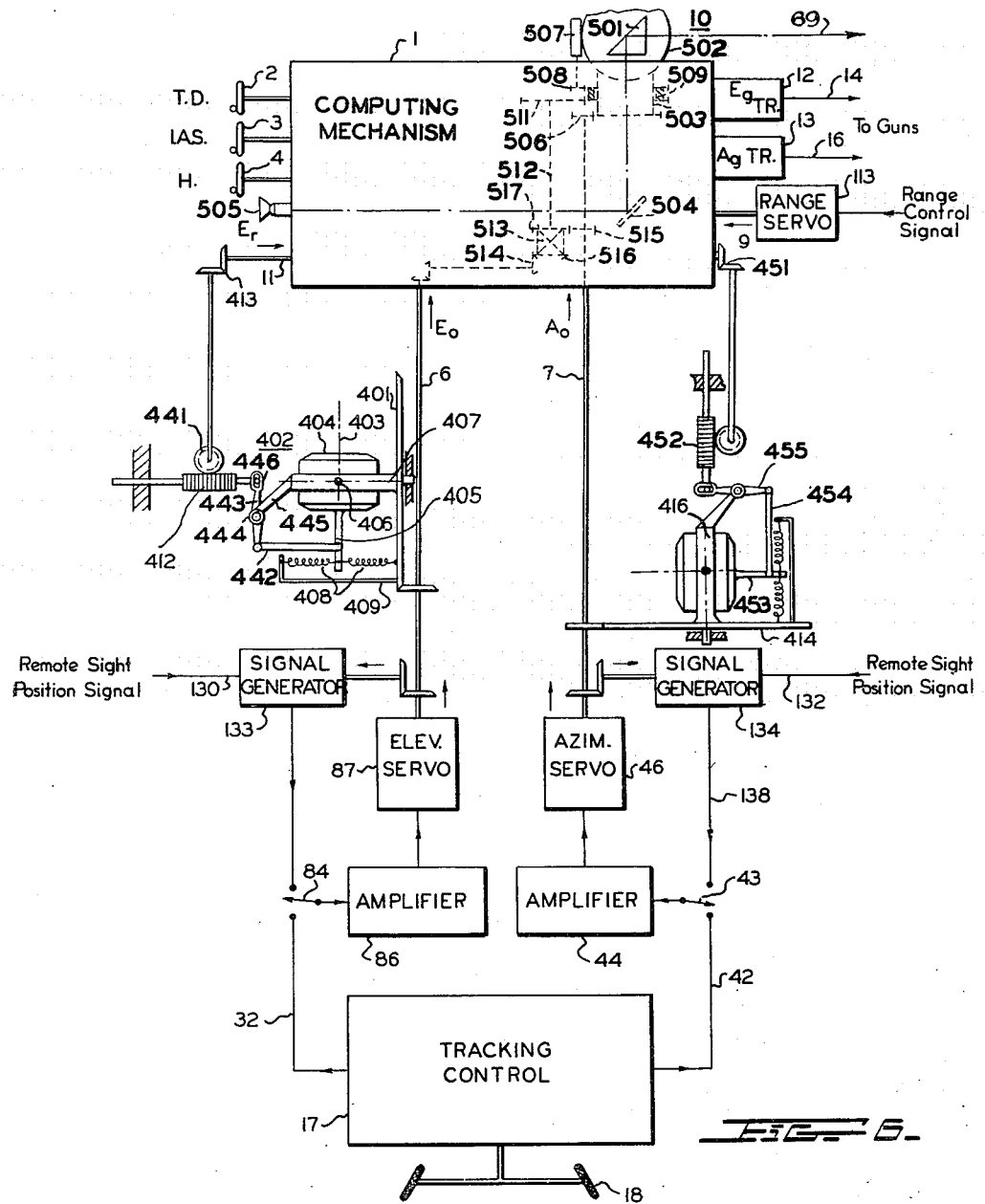

Dec. 1, 1953  C. G. HOLSCHUH ET AL  2,660,793
STABILIZED TRACKING AND FIRE CONTROL SYSTEM
Filed May 22, 1942  7 Sheets-Sheet 4
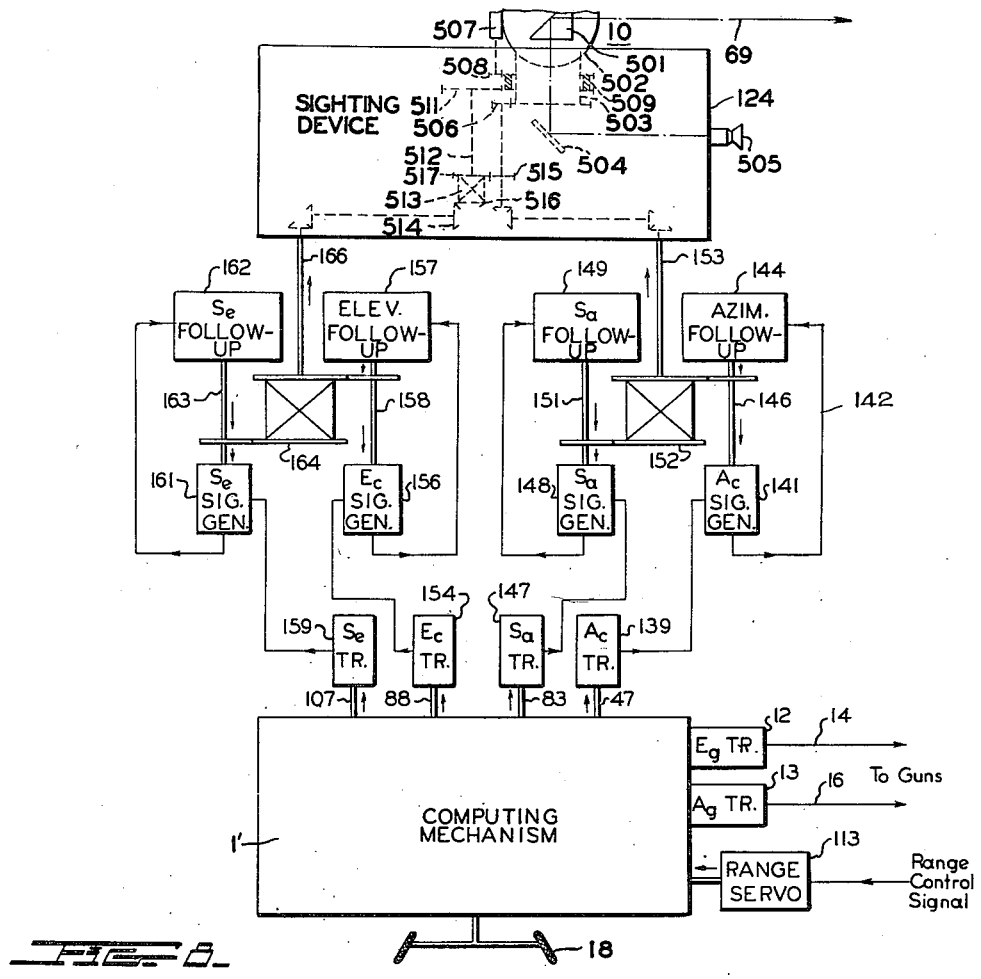
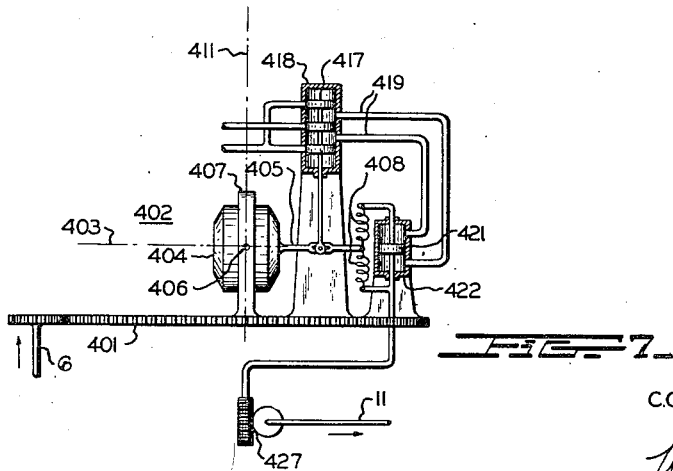
INVENTORS,
C.G.HOLSCHUH, E.B.HAMMOND Jr.,
and W. T. WHITE,
BY
THEIR ATTORNEY.

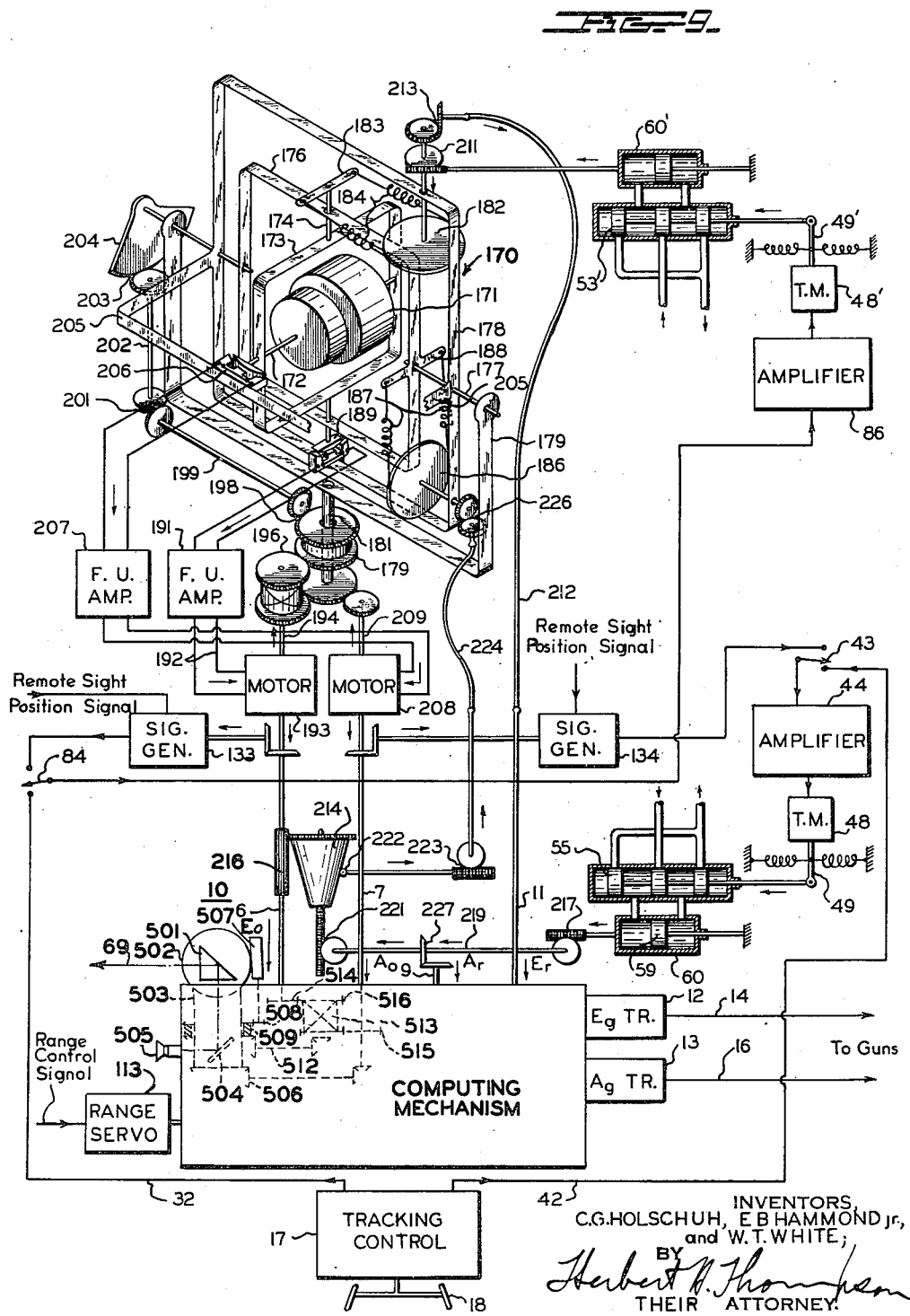

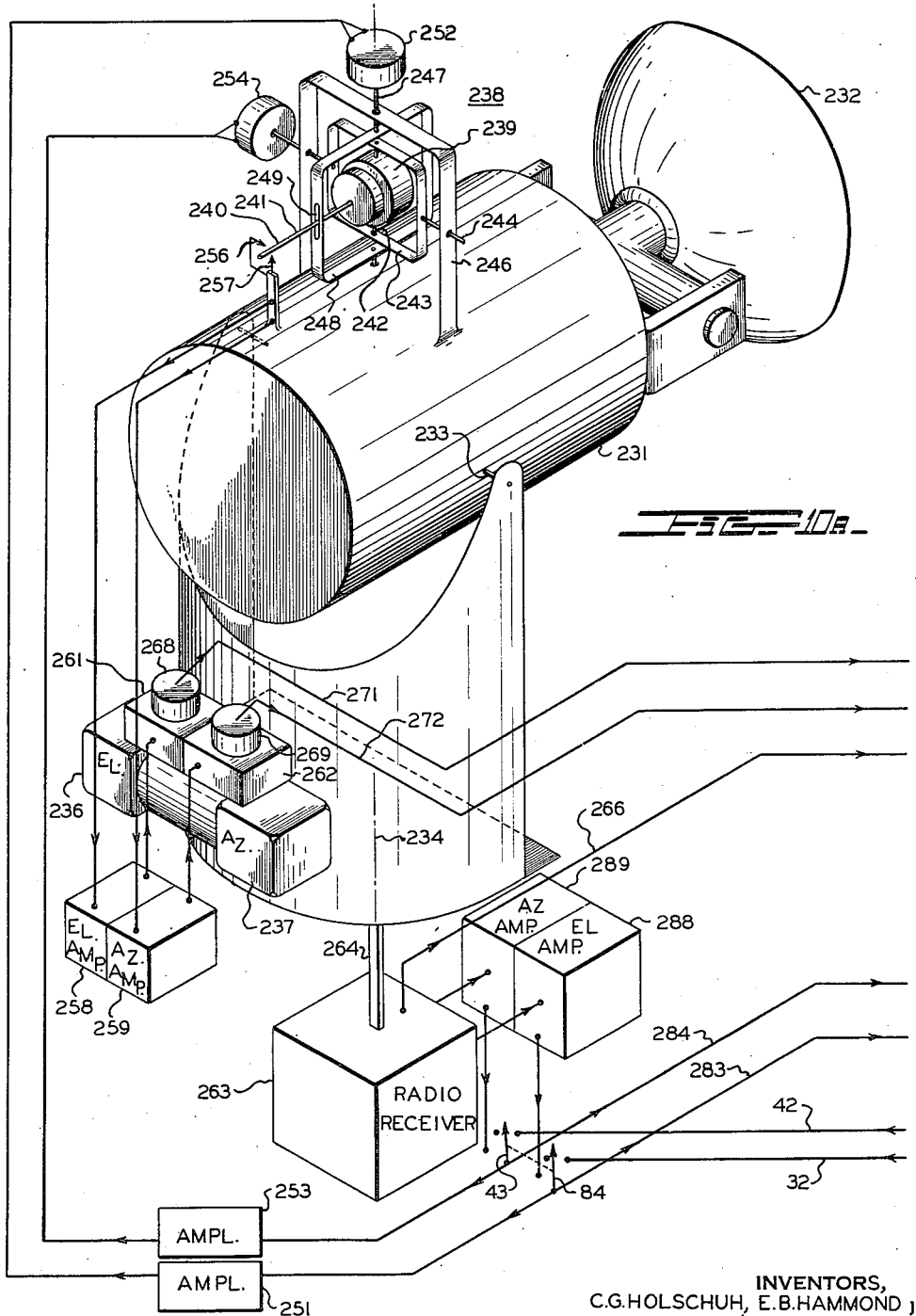

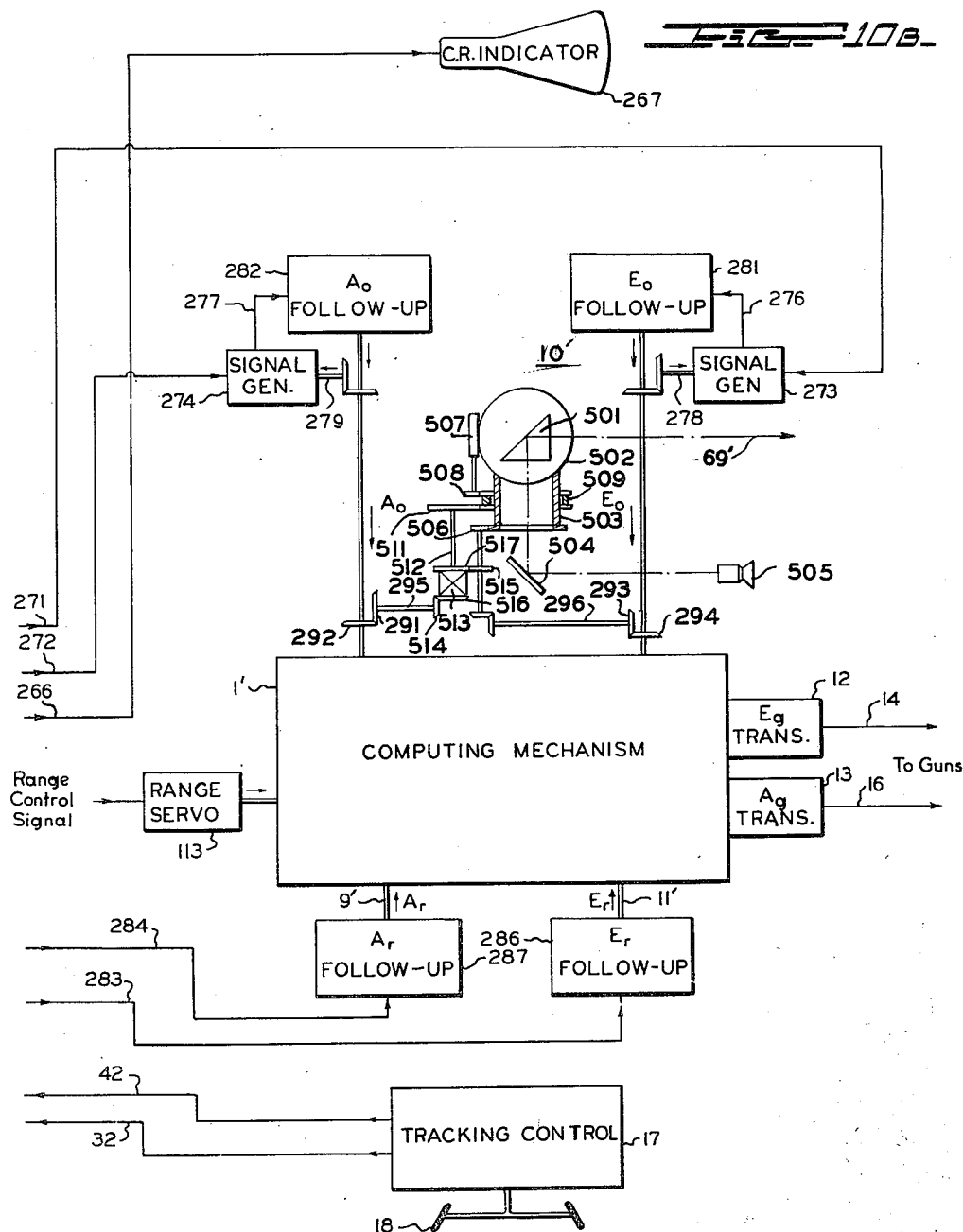

UNITED STATES PATENT OFFICE 2,660,793

STABILIZED TRACKING AND FIRE CONTROL SYSTEM

Carl G. Holschuh, Glen Head, and Edmund B. Hammond, Jr., and Walter T. White, Brooklyn, N. Y., assignors to The Sperry Corporation, a corporation of Delaware Application May 22, 1942, Serial No. 444,152

24 Claims. (Cl. 33—49)

The present invention is concerned with fire control apparatus especially adapted for aircraft use.

In prior systems, such as shown in abandoned application Serial No. 411,186, for Aircraft Gun-Sight and Computer, filed September 17, 1941, in the names of C. G. Holschuh and D. Fram; and application Serial No. 424,612 for Hydraulic Remote Operating Systems, filed December 27, 1941, in the names of E. L. Dawson, F. M. Watkins and C. N. Schuh, Jr., now Patent No. 2,445,765, known interaircraft fire control systems comprise an optical sighting device, a computing mechanism, and remotely controlled gun turrets. The sighting device is manually actuated by the fire control officer to track with a target, and thereby present target position data and present target rate data are set into the computing mechanism. From these input data, the computing mechanism then determines the correct gun aiming angles for properly orienting the guns to intercept the target by a projectile at the target future position. The data determined by the computer then serve to automatically orient the gun turrets to the correct positions. In such prior systems, the controls for the computing mechanism and sighting devices are usually such that a displacement of the manual control produces a corresponding velocity of the sighting device, with an additional proportional component of displacement of the sighting device superimposed thereupon, such control being known as "aided tracking." The target orientation data for the computer are determined from the orientation of the sighting device, which, during the proper tracking condition, corresponds exactly to the target orientation. The target rate data required by the computing mechanism are derived from the displacement of the manual control, which is proportional thereto.

Such fire control systems on aircraft have been found to be highly satisfactory under smooth flying conditions and with good visibility conditions. However, the effective use of such a system is seriously impaired during poor flying conditions or during maneuvers of the craft in which the erratic motion of the craft carrying the sighting device creates great difficulty in properly performing the required tracking operations. These difficulties are overcome in the present system by the provision of proper stabilization, in which the motion of the sighting device produced by the manual control of the operator is referred to a reference which is fixed with respect to space rather than with respect to the craft, as in prior systems. This stabilization is added without affecting the method of operation of the system. Such a stabilization may be produced in several ways.

In one embodiment of the present invention, the elevation and azimuth components of the sighting device orientation and of the target orientation data input to the computing mechanism are independently stabilized by means of respective free gyroscopes which maintain their orientations fixed in space and hence effectively fixed with respect to the earth. Any change in orientation of the craft with respect to space, such as may be caused by rough air, vibration or oscillation of the craft, or by maneuvering of the craft, produce stabilization components which are introduced to control the sighting device and the corresponding data inputs to the computing mechanism. Therefore, in order to maintain the sighting device oriented toward the target, the fire control officer need merely compensate for the motion of the craft with respect to the reference positions defined by the gyroscopes, and, accordingly, his control remains unaffected by variations in attitude of the craft for any reason.

A second embodiment of the invention utilizes a single free gyroscope whose orientation, defined by its spin axis, is made to track with the orientation of the target by the application of suitable precessing torques applied to the respective gimbal axes of this gyro. Considering for the moment a target fixed with respect to space, it will be clear that no precessing torques are necessary to maintain the gyro oriented toward this target and any variations in the attitude of the craft will have no effect upon the orientation of the gyro, since the gyro tends to maintain itself oriented in space. The same situation holds when the target is moving with respect to space, since then the only corrective effects which have to be applied to the gyro to maintain its orientation toward the target are those determined by motion of the target in space or the angular motion of the target relative to the gyro-defined axes, the changing attitude of the craft being completely ineffective in the system. The gyro orientation, being thus stabilized, is used to control the sight orientation and the computer data input.

In addition to the provision of stabilization in the present invention, further improved apparatus is provided for introducing the required rate data into the computing mechanism. Preferably, the manual control operated by the fire control officer is made of the rate type, that is, where the displacement of the control is proportional to the rate of change of the line of sight to be tracked with the target, along the elevation and azimuth components. It will be clear that the rate data required may be obtained directly from the displacement of this manual control, at least in the first embodiment of the invention described above. In the second embodiment of the invention described, the property of gyroscopes, whereby the angular velocity of precession of the spin axis is proportional to the applied torque, is utilized to supply the rate data input to the computing mechanism. Here the manipulation of the manual tracking control by the fire control officer produces a signal, preferably electrical in character, which is utilized to produce a proportional torque on the free gyro. Since the torque, and hence the signal, is thereby proportional to the rate of change of the orientation of the gyro, the signal may be utilized directly to correspondingly control the rate input to the computing mechanism. Alternatively, suitable rate gyroscopes directly coupled to the sight and computer orientation controls may be used to derive the required computer rate data.

In order to overcome the difficulties involving visibility conditions, recourse is had to a radio-operated system similar to that shown and described in copending application Serial No. 441,188 for Radio Gun Control Systems, filed April 30, 1942 in the names of C. G. Holschuh, G. E. White, W. W. Mieher and J. E. Shepherd now Patent No. 2,617,982. As described in this prior application, a radio scanner is provided which, during tracking operations, is utilized either to indicate the relative displacement between the scanner orientation and the target orientation, or to automatically orient the scanner towards the target. In the present system, a similar scanning device is combined with the stabilization described above and the combined results and advantages of stabilization and "radio vision" are obtained, extending the usefulness of such fire control systems to conditions of poor visibility, increased range, and variable or erratic attitude of the craft which were hitherto not realizable.

Accordingly, it is an object of the present invention to provide improved fire control systems useful over an extended range of conditions with respect to prior systems.

It is another object of the present invention to provide improved stabilization devices for sighting devices and in particular for aircraft fire control systems.

It is still another object of the present invention to provide improved devices for producing target rate data and target orientation data for use in computing gun sights.

It is a further object of the present invention to provide improved radio-operated fire control systems for aircraft.

It is still a further object of the present invention to provide improved radio-operated fire control systems for aircraft including stabilization.

Further objects and advantages of the present invention will become apparent from the following specification and drawings, in which Fig. 1 shows a schematic representation of one embodiment of the present invention including the use of separate free gyros for stabilization.

Fig. 2 shows a schematic representation of the tracking control of Fig. 1.

Fig. 3 shows a diagrammatic representation of the elevation or azimuth servo of Fig. 1.

Fig. 4 shows a schematic perspective representation of an alternate form of elevation stabilization device useful in Fig. 1.

Fig. 5 shows a schematic perspective representation of a remote sighting device useful with Fig. 1.

Fig. 6 shows a schematic representation of a modification of the system of Fig. 1, in which rate gyros are used for producing the computing mechanism rate data.

Fig. 7 shows a schematic representation modified form of rate gyro which may be used in the system of Fig. 6.

Fig. 8 shows a schematic representation modified form of computer and sighting device system.

Fig. 9 shows a schematic representation of a further embodiment of the system of the present invention utilizing a free gyro for tracking purposes, and Figs. 10A and 10B, taken jointly, illustrate still another embodiment of the system of the invention utilizing a radio scanning device and the free tracking gyro of Fig. 9 with a remotely situated computing mechanism and tracking control.

Fig. 1 shows one embodiment of the invention adapted to provide an improved and stabilized control for inter-aircraft gun sights and computers, such as of the type shown in above-mentioned copending application Serial No. 411,186.

In this copending application, a computing mechanism is described which is adapted to have set into it data corresponding to target dimension (T. D.), indicated air speed (I. A. S.) of the craft, altitude (H) of the craft, the present position of the target relative to the craft in terms of its elevation ($E_o$), azimuth ($A_o$) and slant range ($D_o$) coordinates, and the rates of change of the azimuth and elevation coordinates ($A_r$, $E_h$), and to produce from these data the proper gun elevation ($E_g$) and gun azimuth ($A_g$) data to determine or indicate the proper gun aiming angles whereby the guns may effectively fire at the future position of the target. A sighting device, such as a telescope, defining a line of sight is coupled to the present position data input so that the orientation of the sighting device corresponds to the data input to the computing mechanism. The orientation of the sighting device and the position data setting of the computing mechanism are manually controlled by the operator, who continuously maintains the orientation of the sighting device coincident with the target orientation, as evidenced by suitable reference marks or cross-hairs on the sighting device. When the sighting device is thus tracking with the target, the proper target position and rate data are provided for the computing mechanism.

In Fig. 1 such a computing mechanism is schematically indicated by the block 1, including its target dimension control 2, its indicated air speed control 3, and its altitude control 4. The arrows placed beside various control shafts and on control wires indicates the direction or flow of control effects. Present target elevation data may be set into the computing mechanism 1 as by shaft 6, present target azimuth data by shaft 7, present target slant range data by shaft 8, azimuth rate data by shaft 9, and elevation rate data by shft 11. Shafts 6 and 7 also serve to control the orientation of the line of sight 69 of sighting device 10.

The sighting device 10 includes a reflecting prism 501 rotatably adjustable about a horizontal axis (in elevation) by a worm gear 502. This worm gear 502 and prism 501 are carried by a main body 503 that is mounted for rotation in azimuth about a vertical axis. The line of sight is reflected by prism 501 into a reflector 504 which reflects it to an eye piece 505 whereby a target in the line of sight may be observed and tracked by the operator.

Azimuth shaft 7 drives a pinion 506 that rotates the main body 503 about a vertical axis and thus adjusts the line of sight 69 in azimuth. The shaft 7, representing the azimuth position of the line of sight 69, is also used to drive the present azimuth ($A_o$) of a target into the computer. Rotation of the worm gear 502 to adjust the elevation of the line of sight is effected by worm 507 that is driven by a gear 508 meshing with a ring gear 509 which surrounds the main body 503 and is free to rotate relative thereto. The ring gear is driven by pinion 511 on a shaft 512 that is in turn driven by the output of a compensating differential 513. The shafts 6 and 7 act through pinions 514 and 515, respectively, to drive gears 516 and 517 representing the input to the differential 513. The purpose of the differential is to prevent changes in azimuth from affecting changes in elevation of the line of sight 69 by rotating ring gear 509 with the main body for changes in azimuth.

From the description, it will be apparent that the shafts 6 and 7 control the elevation and azimuth positions of the line of sight 69 from sighting device 19. For a more complete description of the sight and computer mechanism, reference may be had to the above-mentioned copending application, Serial No. 411,186, filed September 17, 1941.

The computing mechanism 1 actuates a suitable gun elevation synchronous position transmitter 12 and a gun azimuth synchronous position transmitter 13, whose outputs 14 and 15 comprise voltages corresponding to the proper gun aiming angles, and may be used to indicate these angles to remote gunners, or to directly control the orientation of remotely actuated guns in any suitable manner, such as shown in abovementioned copending application Serial No. 424,612.

The present embodiment of the invention is directed towards the provision of suitable stabilization for the computing mechanism 1. As is well known, when any sighting device is mounted on aircraft the unavoidable pitching, yawing, and rolling of the craft create great difficulties when attempting to track the sighting device with a swiftly moving target to determine the target orientation and motion. Accordingly, in the present invention the effect of such erratic motions of the aircraft carrying the computer-sight is minimized by using a standard or reference of position for the control of the computing mechanism input data which is independent of the motion of the craft. In effect, the tracking data input to the computing mechanism are resolved into two components, one component representing the motion of the craft with respect to the position standard, which may be termed the stabilization component, and the second component representing the motion of the target with respect to the standard of position, which may be termed the control component, for reasons which will appear hereinafter. Thus, the total data input represents the motion of the target with respect to the craft, so that the computing mechanism may calculate from these data the correct gun aiming angles, with respect to the craft, for effectively engaging the target.

The stabilization component may be automatically produced by the action of suitable gyroscopes serving as position standards in elevation and azimuth respectively, while the control component may be produced by a manual control serving simultaneously to track the line of sight 69 with the target and to set the target orientation data into computing mechanism 1.

Thus, referring to Fig. 1, there is provided a suitable tracking control 17 actuated from a handle-bar type manual control 18, these being shown more in detail in Fig. 2, where it will be seen that handle-bar control 18 is adapted to be manually rotated about two mutually perpendicular axes 19 and 21, axis 19 being normally horizontal and corresponding to the axis about which motion of the computer line of sight in elevation is produced, and axis 21 being normally vertical and corresponding to the axis about which motion of the line of sight in azimuth occurs. Rotation of control 18 about elevation axis 19 rotates a pinion 22 meshing with a circular rack 23, which is thereby translated along axis 21 in accordance with the displacement of control 18 about axis 19. Connected to rack 23, as by a suitable rod 24, is a second circular rack 26 engaging with a similar pinion 27 which is thereby angularly displaced proportionally to the angular displacement of control 18. Fixed to pinion 27 and actuated thereby is a movable arm 28 of a potentiometer 29 energized from a suitable current source, such as a battery 31. Output circuit 32 is connected between a variable arm 28 and the center-tap 33 of potentiometer 29.

It will, therefore, be apparent that rotation of control 18 by a predetermined amount in either direction from a neutral position corresponding to coincidence of arm 28 with tap 33 will produce a voltage output in circuit 32 corresponding in polarity and magnitude to the sense and magnitude of angular displacement of control 18 about axis 19, which will be termed the elevation control signal voltage.

It will be clear that the control just described need not be restricted to the use of direct current, but may also use an alternating-current source in place of battery 31, in which case the elevation control signal voltage output across wires 32 will be a reversible-phase variable-magnitude alternating voltage. If desired, an auto-transformer may replace potentiometer 29 in such case. Also, any other device for producing a signal corresponding or proportional to displacement of control member 18 may be used.

Displacement of handle-bar control 18 about azimuth axis 21 causes a corresponding angular displacement of a bevel gear 34 fixed thereto. Gear 34 engages a further gear 36 fixed to shaft 35 which actuates the variable arm 37 of a similar potentiometer 38 energized in a similar fashion from battery 39 or from an alternating-current source. The azimuth control signal voltage, again taken between variable arm 37 and center tap 41 and appearing in output cable 42, will be of the same type as the elevation signal voltage in cable 32.

It will be clear that rotation of control 18 about axis 19 is completely independent of its rotation about axis 21 and the operator is thereby permitted to make independent or simultaneous adjustments corresponding, as will be seen, to the desired elevation and azimuth adjustments of computer 1 for effecting tracking with the target.

The present invention is not restricted for use with the particular type of control shown in Fig. 2, although it is to be noted that this control contains the great advantage of providing a natural type of control having a convenient and natural way of operation without requiring decided mental effort on the part of the operator. If desired, any other type of control adapted to produce two independent reversible phase or reversible polarity and variable magnitude signal voltages may be used in place of the control shown in Fig. 2.

Referring once more to Fig. 1, the azimuth control signal voltage appearing in cable 42 is connected through a suitable switch 43, when in the down position, to an amplifier 44 of any suitable conventional type adapted to produce in its output, under the control of the azimuth control signal voltage, a suitable control voltage for controlling the azimuth servo 46. Servo 46 may be of any desired type preferably adapted to produce an angular velocity of its output shaft 47 corresponding in sense and magnitude to the sense and magnitude of the azimuth control signal voltage, and hence to the sense and magnitude of the angular displacement of handle-bar control 18 about azimuth axis 21.

One suitable type of such servo is shown in Fig. 3, although the present invention is not necessarily restricted to this type. Here the control voltage appearing on cable 42 is connected to amplifier 44 through switch 43. Amplifier 44 in this instance is adapted to produce in its output a reversible polarity direct voltage which controls a suitable torque motor 48 of any conventional type adapted to produce an angular displacement of its output member 49 in a direction and of a magnitude corresponding to the angular displacement of control 18.

As shown, output member 49 may be centralized by suitable springs 51, which also assure a linear and proportionate type of control. Output member 49 is adapted to reciprocate the control piston 52 of a suitable control valve 53 which is supplied with hydraulic or pneumatic pressure from a suitable pump as by a duct 56 and is connected to a fluid return reservoir or sump by a duct 54. Valve 53 is adapted to produce between its output ducts 57 and 58 a differential fluid pressure corresponding in sense and magnitude to the relative displacement between its piston 52 and movable cylinder 55.

This differential pressure is led to a servo-motor 60 having a fixed piston 59 and a movable cylinder 65 fixed to cylinder 55 of valve 53. The pressure causes cylinder 65 to move, thereby decreasing the differential pressure by repositioning cylinder 55 toward its neutral position with respect to piston 52. In this manner cylinder 65 is displaced by an amount corresponding to the displacement of arm 49 of torque motor 48. It will be clear that valve 53 and motor 60 provide a booster or servo system for reproducing the displacement of the output 49 of torque motor 48 with increased power. Any other type of booster or servo system may be used here.

The displacement of cylinder 65 actuates the input of a suitable variable speed device, such as the well-known "Vickers" variable-displacement hydraulic type, which has an input A-end 61 comprising a continuously driven variable displacement pump driven from a suitable power motor 62, the pump displacement being varied by adjustment of a control rod 63 connected to cylinder 65. The adjustable fluid output of A-end 61 is led to the output B-end 64 of the hydraulic unit, which comprises a fluid motor driving its output shaft 47 at an angular velocity which is thereby proportional to the setting of control member 63. In this way there is produced an angular velocity of output shaft 47 corresponding to the angular displacement of control 18, and hence to the desired control in azimuth of computing mechanism 1. Any other type of variable-speed drive could also be used.

It is to be noted that control member 63 of A-end 61 of the servo 46 (Fig. 3) may be actuated directly and mechanically from shaft 35 of tracking control 17 (Fig. 2) where it is not necessary or desirable during manual tracking to use a remote control unit 17 as in Fig. 1.

Since the displacement of control member 63 represents the rate at which output shaft 47 is rotating, the rate data required by the computer 1 may be obtained directly. Thus, also actuated by cylinder 65 is a suitable rack and pinion arrangement 66 actuating a shaft 67. Shaft 67 will accordingly be displaced by an amount corresponding to the rate at which shaft 47 is rotating. The angular displacement of shaft 47 representing the control azimuth ($A_c$) is added to the azimuth stabilization components ($S_a$) to be described, in a suitable differential 68, and the sum of the rotation of shaft 47 and the azimuth stabilization component, resulting from the output of differential 68, serves to rotate shaft 7 and thereby sets the target present azimuth data ($A_o$) into the computing mechanism 1.

In operation the gunner will actuate control 18 which, as has been described above, controls the rate at which the data are set into computing mechanism 1, in such a manner as to cause the optical line of sight 69 of sighting device 16, whose orientation corresponds to the $A_o$ and $E_o$ settings of computing mechanism 1, to follow and track with the target. When this is done the required present target azimuth data $A_o$ will be set into computing mechanism 1 by way of shaft 7.

The standard of position from which azimuth stabilization is derived, is shown as a suitable directional gyro, indicated schematically as 70, having a rotor spinning within a rotor bearing frame 71 about a normally horizontal spin axis 72. Frame 71 is pivoted as by pivots 73 about a normally horizontal gimbal axis within a vertical ring 74 rotatably mounted about vertical axis 76 in pivots carried by the craft.

As is well known, a directional gyro of this type tends to maintain the orientation of its spin axis 72 fixed and in a horizontal plane. Should the craft change its attitude in azimuth, as either by change of course or by yawing, it will be clear that, since gyro 70 maintains its orientation fixed, a relative displacement will occur between the gyro spin axis and the craft axis.

This change may be sensed by a pick-off, indicated schematically at 77, which may be of any well known type adapted to produce a signal corresponding in sense and magnitude to the sense and magnitude of the displacement between the heading of the craft and the directional gyro spin axis.

The output of pick-off 77 is fed to a suitable amplifier 78 whose output controls a suitable motor 79. Amplifier 78 and motor 79 may be of any well known type, either direct current or alternating current, adapted to produce a rotation of motor 79 in one direction or the other so long as any signal is produced in pick-off 77. Well-known anti-hunt devices may be used to assure immediate stopping of motor 79 upon cessation of signal from pick-off 77.

Motor 79 actuates a suitable worm and worm wheel arrangement 81 which, through a crank 82, acts to reposition pick-off 77 to its neutral position with respect to vertical ring 74 of gyro 70.

The system just described, therefore, operates as a simple follow-up device, causing crank 82 and worm wheel 81 to follow-up the position of the gyro spin axis 72. In so doing, shaft 83, connected to follow-up worm wheel 81, is angularly displaced by an amount corresponding to the angular deviation between the gyro spin axis and the craft axis. By making the follow-up action quite rapid so that instantaneous changes of craft attitude are immediately sensed and correspondingly actuate shaft 83, it will be clear that the angular displacement of shaft 83 will represent the instantaneous deviation of the craft from a fixed standard of position provided by the gyro 70.

Accordingly, this angular displacement of shaft 83 will represent the desired stabilization in azimuth ($S_a$) which, as described above, is added to the azimuth control data ($A_c$) in differential 58 and thereby serves to stabilize the present target azimuth data ($A_o$) set into computing mechanism I by means of shaft 7, since the operator actuating manual control 18 to track with sight 10 need compensate only for the motion of the target with respect to the standard of position provided by directional gyro 70, the stabilizing mechanism automatically providing the stabilization component. This stabilization of the computer and sight insures a smoother type of tracking and facilitates accurate tracking with the target, since the random fluctuations of the line of sight produced by the motion of the craft need not be corrected by the control 10 but are automatically corrected by the stabilizing gyro 70 and its associated equipment.

The control of computing mechanism 1 in elevation is derived in a similar manner, the elevation control signal voltage appearing in output cable 32 and being connected through a suitable switch 84 to an amplifier 86, and thereby to the elevation servo 87 whose output 88 represents the elevation control data ($E_c$). These data are combined with the elevation stabilizing data ($S_e$) in differential 89 to provide the present target elevation data ($E_o$) as the angular displacement of shaft 6.

In order to provide the elevation stabilization data, there is provided a suitable gyro-vertical 90 comprising a rotor spinning about a normally vertical axis 91 within a rotor bearing frame 92 which is pivotally mounted about a normally horizontal axis 93 within a horizontal ring 94, which in turn is pivotally mounted about a horizontal axis 96 within a bracket 97, rotatable about a vertical axis preferably coincident with vertical spin axis 91 of the gyro 90.

Bracket 97 is rotated directly from present target azimuth data ($A_o$) shaft 7 as by suitable gearing 98, shaft 99, and gearing 101, so as to maintain axis 93 within the vertical plane containing the target orientation line. By so doing, it will be clear that any change in the attitude of the craft with respect to axis 96 will represent a change in the elevation $E_o$ of the target orientation with respect to the craft.

By a follow-up system similar to that used with directional gyro 70, a motor 102 is caused to produce a rotation of its output shaft 103 corresponding to any deviation in the attitude of the craft about axis 96 with respect to the vertical standard of position provided by vertical gyro 90.

From the discussion above it will be clear that this angular displacement of shaft 103 will be the desired elevation stabilization correction ($S_e$). This angular displacement is transmitted as by way of suitable rack and pinion arrangements 104 and 106 passing through the stem of bracket 97 to a shaft 107 and thereby to differential 89, wherein it is combined with the elevation control data ($E_c$) to form the present target elevation data ($E_o$) which is set into computing mechanism 1 by way of shaft 6.

Accordingly, it will be clear that in tracking with a swiftly moving target all erratic variations of the craft in azimuth and elevation with respect to the vertical and the horizontal are sensed by directional gyro 70 and vertical gyro 90, and suitable corrections are introduced into the computing mechanism control, whereby the operator need only set in the control data ($E_c$, $A_c$) corresponding to the movement of the target with respect to the vertical and horizontal standards of position. Thereby the line of sight, insofar as the operator is concerned, is effectively stabilized and the changes in attitude of the craft have no effect upon his control, so that the operator may more easily track the line of sight with a fast-moving target.

It is to be noted that the present elevation data ($E_o$) and azimuth data ($A_o$) represent the instantaneous elevation and azimuth of the target with respect to the craft and, accordingly, the gun aiming angles ($E_g$) and ($A_g$) determined by the computing mechanism 1 are also with respect to the craft, whereby they may be directly utilized to control the aiming of the guns, which is most easily done with reference to the craft on which the guns are mounted.

The rates of change of azimuth and elevation may be obtained from the servo mechanism as described with respect to Fig. 3, and these rates, such as the azimuth rate ($A_r$) corresponding to the angular displacement of shaft 67, and the elevation rate ($E_r$) corresponding to the angular displacement of shaft 108, are led by suitable gearing and shafts to the respective rate data inputs 9 and 11 of computing mechanism 1.

The present target slant range data ($D_o$) required by computing mechanism 1 may be provided by a suitable range control pedal 109 cooperating with a potentiometer arrangement 111, which thereby provides a range signal voltage of a type similar to the elevation and azimuth signal voltages already described. This range signal voltage is fed through a suitable switch 112, when in the left position, to the range servo 113, which may be of the same type as that shown in Fig. 3 and, accordingly, actuates the range input 8 of computing mechanism. If desired, range servo 113 need not be of the rate control type such as elevation and azimuth servos 87 and 46, but may be of the pure displacement type in which the angular displacement of its output shaft 114 corresponds to the angular displacement of control pedal 109. It is to be understood that servo 113 includes any necessary amplifiers and anti-lag and anti-hunting devices. Such servos are well known in the art, and need not be further described. In this manner all the data required by computing mechanism are supplied thereto.

The system just described may be termed a "rate control" system, since a given displacement of control 18 produces a corresponding rate of change of the line of sight in azimuth and/or elevation. However, the present invention need not be restricted to such a type of control, but may equally well be used with pure "displacement control" systems or combined rate and displacement control systems, known as "aided tracking" systems.

Fig. 6 shows an alternative system for obtaining the elevation and azimuth rate data required by the computing mechanism 1. The apparatus for obtaining the stabilization correction data ($S_e$) and ($S_a$) has been omitted from Fig. 6, but it is to be understood that the stabilizing apparatus described with respect to Fig. 1 or with respect to subsequent figures may be used with the system of Fig. 6.

Thus, in Fig. 6 the present target elevation data input shaft 6, which is controlled by elevation servo 87 from control 18 as in Fig. 1, serves to rotate a platform 401 geared thereto. Platform 401 supports a rate gyro 402, comprising a rotor spinning about an axis 403 within a rotor housing 404 which is pivoted about an axis 406 within a bracket 407 supported on platform 401. Motion of the gyro housing 404 about axis 406 is restrained by means of springs 408 connected to arm 405 and mounted on a bracket 409 also fixed to platform 401. Preferably the intersection of axes 403 and 406 coincides with the axis of rotation 411 of platform 401.

In this manner, as is well known, rotation of platform 401 applies a torque to rotor housing 404 about the axis of platform 401, thereby causing precession of the rotor axis 403 about axis 406. In accordance with the well-known theory of rate gyroscopes, the deflection of spin axis 403 is thereby rendered proportional to the rate of turn of platform 401, and accordingly, is a measure of the rate of turn of shaft 6, so that it represents elevation rate data ($E_r$). This deflection of spin axis 403 is used to actuate the elevation rate input shaft 11 of computing mechanism 1 through a circular rack 412 and pinion 441 that drives gearing 413, whereby the proper rate data ($E_r$) are set into computing mechanism 1. To permit rotation of the gyro 402 without affecting the displacement of rack 412, the arm 405 extending along spin axis 403 is pivoted to one end of link 442 that has its other end pivotally connected to lever 443 having its fulcrum 444 carried by an arm 445 extending from the bracket 407. The lever is coupled by a sliding joint 446 to translate the rack in response to movement of the gyro spin axis and arm 405. If desired, or necessary, a power booster of any well-known type may be inserted to drive shaft 11 from gyro 402.

A similar arrangement, including a platform 414 and a rate gyroscope 416 mounted thereon, is actuated from present target azimuth data input shaft 7, and serves to displace azimuth rate input shaft 9 in accordance with the azimuth rate data ($A_r$) in a similar manner. Gearing 451 driving azimuth rate shaft 9 may also be controlled by a circular rack 452 that is translated by movement of arm 453 through link 454 and lever 455 in a similar manner to that described in connection with gyro 402.

Although the system of Fig. 6 has been described as being a rate control system, as in Fig. 1, it will be clear that a displacement control system or aided tracking system may be used here also, without affecting the operation of the rate data inputs. This follows from the fact that the rate gyros 416 and 402 effectively "sense" or measure the rate of rotation of shafts 7 and 6, which, during tracking, have angular displacements corresponding to present target position data, whereby there is produced accurate present target rate data, as required, without regard to the type of control which produces the tracking condition.

Fig. 7 shows a modification of the rate gyro devices of Fig. 6. Thus, here the gyro 402 is mounted on the platform 401 by means of a bracket 407 within which the gyro rotor housing 404 is pivoted about an axis 406, as in Fig. 6. Platform 401 is driven from the data input shaft, such as 6. An arm 405 coaxial with the spin axis of the gyro 402 is fixed to the gyro rotor housing 404. Upon turning of the platform 401 the arm 405 will rotate about axis 406 in a clockwise or counterclockwise manner depending upon the direction of rotation of platform 401. Assuming for illustrative purposes that arm 405 moves in a counterclockwise direction or upward, it then serves to move upwardly the piston 417 of a pneumatic or hydraulic pilot valve 418 of any conventional type, adapted to produce in its output ducts 419 a differential fluid pressure corresponding in sense and magnitude to the displacement of piston 417. This differential pressure is lead by ducts 419 to a servomotor 421, and is applied to the opposite faces of the piston 422 thereof.

Fixed to piston 422 are the gyro centralizing springs 408 which tend to maintain arm 405 in a centralized position. Thus, the differential pressure created by valve 418 is led to servomotor 421 in such sense that one or the other of the springs 408 will resist the motion of arm 405.

In effect, piston 422 in the illustration used would be forced downward by this differential pressure until the downward force transmitted through the springs 408 to shaft 405 is sufficient to counteract the torque tending to rotate arm 405 upwardly due to the rotation of platform 401. An equilibrium condition will be reached in which shaft 405 has been returned to substantially the same position it assumes when platform 401 is at rest.

Since springs 408 are linear devices, it will be clear that the displacement of piston 422 necessary to produce this equilibrium condition will be proportional to the torque exerted by arm 405 and therefore will be proportional to the rate of turn of platform 401.

Accordingly, this motion of piston 422 may be used to set in the required rate data into the computing mechanism 1. As shown in Fig. 7, this may be done by means of a suitable rack and pinion arrangement 427 actuating the rate input shaft 11. Preferably, rack 427 is made circular in shape and concentric with the axis of rotation 411 of platform 401 in order that the rotation of platform 401 shall have no effect upon the transmission of the rate data from piston 422 to rate data input shaft 11.

It will be clear that this device of Fig. 7 may be used both for the elevation rate data input and for the azimuth rate data input to computing mechanism 1 in place of the corresponding portions of Fig. 6.

In the system of Figs. 6 and 7, the spin axis of gyros 402 and 416 may be arbitrarily oriented with respect to the craft in which they are mounted, so long as the system is used only with straight line flight of the craft. Should the craft be turning, however, it is possible that false rates will be produced, due to the response of gyros 402 and 416 to the angular velocity of the craft. Accordingly, it is desirable to maintain the spin axis of azimuth rate gyro 416 oriented in a vertical direction with respect to the craft, whereby the angular velocity of turning of the craft will be ineffective to produce false output from gyro 416. Should angular velocity of the craft in pitch about the line of sight or target orientation be material, the spin axis of elevation rate gyro may be maintained horizontal and perpendicular to the line of sight, by apparatus similar to bracket 97 and its associated equipment of Fig. 1, whereby any angular velocity of the craft about the elevation axis of the line of sight is also ineffective.

The elevation stabilizing system described with respect to Fig. 1 is most effective only where the attitude of the craft deviates little with respect to the position standard provided by vertical gyro 90, since it will be seen that for large displacements the rotation of bracket 97 may introduce precessing torques due to gimbal friction which would disturb the reference position of gyro 90. To overcome this defect the stabilization device shown in Fig. 4 may be substituted for that of Fig. 1.

In this instance vertical gyro 90 is replaced by a further directional gyro 115 having a rotor spinning about a horizontal axis 116 within a rotor bearing frame 117 pivotally mounted about a vertical axis 118 within the vertical ring 119 which itself is pivotally mounted about horizontal axis 96 within bracket 97.

Bracket 97 is rotated in accordance with present azimuth ($A_o$) as by way of gearing 101 similar to Fig. 1, to keep axis 96 perpendicular to the line of sight. It will be clear that any rotation of bracket 97 about the vertical axis will tend to produce a rotation of vertical ring 119 with respect to rotor frame 117, since the spin axis 116 of gyro 115 tends to remain fixed in space.

However, in the present device the spin axis 116 is caused to remain perpendicular to horizontal axis 96 at all times by the operation of a suitable follow-up system comprising a pick-off 121, a follow-up amplifier 122, and a torque motor 123. Any deviation of spin axis 116 from a condition of perpendicularity with respect to pivot axis 96 is sensed in pick-off 121, which produces suitable signal voltages amplified in follow-up amplifier 122 and then fed to a conventional torque-creating device 123, which creates a torque about axis 96 thereby precessing the gyro rotor 117 about vertical axis 118 until spin axis 116 is again correctly oriented.

In this way, spin axis 116 is maintained in a horizontal position in the vertical plane containing the line of sight 69. Consequently, any changes in the attitude of the craft occurring about axis 96 will represent changes in the elevation of the target with respect to the craft, during tracking.

A follow-up device, including motor 102, is provided similar to that in Fig. 1 and provides an angular displacement of its output shaft 103 proportional to the change in attitude of the craft about axis 96 with respect to the position standard defined by gyro 115. Accordingly, this rotation represents the desired elevation stabilization correction ($S_e$) discussed above and the device of Fig. 4 may therefore be substituted for the corresponding portion of Fig. 1.

The system of Fig. 1 or Fig. 6 is also adapted for use with a remote sighting device such as a remote telescope, sound locator, searchlight, etc. or a remote radio sighting device similar to that described in copending application Serial No. 441,188. Such a sighting device is indicated schematically in Fig. 5 illustrating a line-of-sight-defining member 124 shown as being an optical telescope. It is to be understood that any other line-of-sight-defining device may be used. Telescope 124 may be pivoted about a horizontal axis such as 126 carried by a bracket 127, itself rotatable about a vertical axis 128. Suitable means for controlling telescope 124 either manually or remotely may be provided but are not shown in this figure.

Coupled to axis 126 is a suitable elevation self-synchronous transmitter 129 of any well-known type whose output cable 130 thereby contains signal voltages representing the position of telescope 124 in elevation. A similar azimuth self-synchronous transmitter 131 is suitably coupled to bracket 127 to represent the azimuth position of sighting device 124 in its output cable 132.

Cables 130 and 132 are connected to suitable self-synchronous signal generators 133 and 134, of any well-known type respectively actuated from the elevation control data as by gearing 135 and azimuth control data as by gearing 136. Generators 133 and 134 are adapted to produce control signals in output cables 137 and 138 representing the relative elevation and azimuth displacements between the orientation of sighting device 124 and the orientation control data setting ($A_c$, $E_c$) of computing mechanism 1.

These control signals are connected through switches 84 and 43, now in the upper position corresponding to remote control, to amplifiers 86 and 44 controlling the servos 87 and 46 in the manner described above. Accordingly, the azimuth and elevation control of the computing mechanism 1 is now effected merely by tracking with the target by means of sighting device 124, which may be manually or automatically actuated in any desired manner.

In the present case it will be clear that sighting device 124 does not have its line of sight stabilized in the same manner as the line of sight 69 of Fig. 1. If desired, as shown in Fig. 1, signal generators 133 and 134 may be actuated directly by the target position data, by coupling them respectively to shafts 6 and 7. In such a case, the computer data stabilization provided by gyros 70 and 90 will be ineffective, since no matter what corrections are derived from the gyros, servos 87 and 46 will be so actuated as to maintain shafts 6 and 7 in correspondence with the respective components of the orientation of sighting device 124.

In order to provide proper stabilization for the line of sight of the remote sighting device, recourse may be had to the system of Fig. 8. Here manual control 18 actuates computer 1' in the same manner described with respect to Fig. 1. Computer 1' comprises the complete system shown in Fig. 1, or may be as in Fig. 1 modified as by Fig. 4 and/or Fig. 6, if desired.

The sighting device 124 is now adapted to be actuated by means of suitable follow-up devices deriving their control from the computer 1'. Thus, in azimuth, computer 1' will be provided with an azimuth control self-synchronous transmitter such as 139 which may be suitably coupled to shaft 47 (Fig. 1). If desired, signal generator 134 of Fig. 1 may serve as transmitter 139 by suitable well-known circuit connections.

Transmitter 139 is connected to the (Ac) signal generator 141 in whose output 142 there is generated a signal voltage in accordance with lack of correspondence between transmitter 139 and signal generator 141, representing relative displacement between the setting of computer 1' and the orientation of device 124, as will be seen. This voltage is fed to any conventional type of follow-up device 144 whose output 146 repositions signal generator 141 in correspondence with transmitter 139. In this way, output shaft 146 of the azimuth follow-up 144 is positioned in correspondence with shaft 47 of computer 1' as shown in Fig. 1.

Similarly, the output of the azimuth stabilizing apparatus comprising the angular displacement of shaft 83 actuates a suitable azimuth stabilization transmitter 147 which in similar fashion is connected to an azimuth stabilization signal generator 148 controlling the (Sa) follow-up 149 which positions its output shaft 151 in correspondence with the position of shaft 83 of Fig. 1.

The angular displacements of shafts 146 and 151 are combined in a differential 152, during tracking represents the present target azimuth (Ao). Shaft 153 then controls the orientation of the line of sight of sighting device 124 in azimuth in a manner similar to that in which shaft 7 controls the device 10 as described in connection with Fig. 1.

In a similar manner, elevation control data (Ec) appearing on shaft 88 is used to actuate a suitable transmitter 154, signal generator 156, and follow-up 157, to position shaft 158 in correspondence with the (Ec) data, and the elevation stabilization data (Se) appearing on shaft 107 actuates a suitable transmitter 159, signal generator 161, and folow-up 162 to position shaft 163 in accordance with (Se) data. The angular displacements of shafts 158 and 163 are combined in differential 164 to actuate the (Eo) input 166 thereby controlling sighting device 124 in a manner similar to that in which shaft 6 controls the elevation of the sight 10 in Fig. 1. It is to be understood that follow-ups 162, 157, 149 and 144 may include any necessary or desirable amplifiers and anti-hunting devices.

In this manner, sighting device 124, even though remotely situated from computer 1, may replace the built-in optical system 10 that defines the line of sight 69 in Fig. 1. Manual control 17, 18 (Fig. 1) may also be remotely situated. As described above, sighting device 124 need not be a purely optical device such as a telescope, but may comprise a radio-locator, an infra-red tracking device, a searchlight, a sound locator, supersonic locator, or any other device defining an effective line of sight adapted to be tracked with a swiftly moving target.

The system just described corresponds closely to that in Fig. 1, and operates in a similar manner. The operator actuates manual control 18 until the line of sight of sighting device 124 coincides with the target orientation, at which time the proper data are set into computer 1'. Since sighting device 124 is stabilized similar to that of Fig. 1, the operator need correct for the motion of the target only with respect to gyros 79 and 90, and hence with respect to the earth, so that a completely stabilized system is obtained. If desired, the stabilizing apparatus may be located directly at the sighting device 124.

If it is desired to control sighting device 124 from any other apparatus, such a suitable radio circuit similar to that described in copending application Serial No. 441,188, control of the azimuth and elevation follow-ups 144 and 157 may be derived from any source of signal voltage connected to their inputs. However, in this case the sighting device 124 will still remain stabilized since the stabilization data (Sa) and (Se) from computer 1 are still effective in assisting to orient sighting device 124 by means of its data input shafts 153 and 166. Sighting device 124 may then control computer 1' in the manner described with respect to Figs. 1 and 5, thus providing an entirely automatic and stabilized fire control and tracking system.

Fig. 9 shows a further and preferred modification of an optical sighting system with apparatus for stabilizing the input to computing mechanism 1, in this instance using a single gyro 170 both for stabilization and for the production of the rate data required by computing mechanism 1. It is to be understood, however, that the rate data deriving apparatus of Figs. 6 or 7 may be used in place of the corresponding apparatus of Fig. 9.

Gyro 170 comprises a rotor 171 spinning about an axis 172 gimbaled within a ring 173, which is pivoted about an axis 174 perpendicular to spin axis 172 and gimbaled within a further ring 176. Ring 176 is mounted pivotally for rotation about an axis 177 perpendicular to axis 174 within a follow-up ring 178, which is also pivoted for rotation about axis 177 within a bracket 179. Bracket 179, in turn, is pivoted about a vertical axis 181.

Gyro 170 in this instance is a free gyro, adapted to have various control precessing torques applied to it. Thus, a torque may be applied about axis 174 by rotation of a pulley 182 connected by means of springs 184 to extending arms 183 fixed to or integral with pivot axis 174. Rotation of pulley 182 in one sense or the other will produce a corresponding tension or compression in springs 184 and will thereby produce a torque on ring 173 and gyro rotor 171 about axis 174. Furthermore, by the use of springs 184, the torque applied to ring 173 will be linearly proportional to the angular displacement of pulley 182.

In a similar manner, by means of a pulley 186 and springs 187 fixed to projections 188 on ring 176 a corresponding torque may be applied to ring 176 about axis 177. Here again the torque applied is proportional to the angular displacement of pulley 186.

Follow-up ring 178 is caused to remain in a plane perpendicular to the spin axis 172 of gyro 170. For this purpose a pick-off, conventionally represented at 189, is provided for sensing relative displacement between spin axis 172 and follow-up member 178 about axis 177. The output of pick-off 189 is suitably amplified in a follow-up amplifier 191, which, through leads 192, controls a follow-up motor 193. The output shaft 194 of motor 193 acts through a differential 196, whose function will be described hereinafter, to rotate a member 179 floatingly supported about axis 181. Member 179 causes rotation of gear 198, shaft 199, gearing 201, shaft 202, and gearing 203, to rotate gear sector 204, which rotates follow-up ring 178 about axis 177 to return pick-off 189 to its neutral position. In this manner, by proper design of the follow-up 189, 191, 193, follow-up ring 178 remains in correspondence with the spin axis 172 about axis 177.

A second pick-off 206 senses relative displacement between follow-up ring 178 and spin axis 172 about axis 174. Through the operation of pick-offs 189 and 206 and their associated circuits, spin axis 172 is always maintained perpendicular to the plane of follow-up ring 178. The output of pick-off 206 is fed to a follow-up amplifier 207 controlling a follow-up motor 208, whose output shaft 209 rotates bracket 179 about vertical axis 181 and thereby serves to reposition follow-up ring 178 into correspondence with spin axis 172. In this manner, spin axis 172 is always maintained perpendicular to the plane of follow-up ring 178.

Spin axis 172 is maintained oriented toward and tracks with the desired target, as will be described hereinafter. Accordingly, the angular displacement of follow-up ring 178 about axis 177 from a predetermined neutral position will represent the actual elevation ($E_o$) of the target. Since this angular displacement is proportional to the angular displacement of output shaft 194 of follow-up motor 193, it will be seen that this shaft 194 may be coupled directly to the present target elevation data input shaft 6 of computing mechanism 1 to supply the required present target elevation data thereto.

In a similar manner, the angular displacement of spin axis 172, and hence of follow-up ring 178 which maintains fixed relation thereto, about axis 181, will represent the actual present target azimuth data ($A_o$) required by the computing mechanism 1 and, accordingly, output shaft 209 of follow-up motor 208 may be coupled directly to present target azimuth data input shaft 7 of computing mechanism 1 to supply present target azimuth data thereto.

The apparatus for causing gyro spin axis 172 to track with the target will now be described. It is to be understood that a suitable orientable sighting device 10 capable of indicating coincidence with the target orientation is provided, and is coupled as in Fig. 1 to shafts 6 and 7 to maintain the line of sight 69 coincident with that of spin axis 172. For operating the system, a manual tracking control device 17, similar to that described with respect to Fig. 1, is actuated by a tracking control 18 to provide in its outputs 42 and 32 the respective azimuth and elevation control signals necessary to maintain the sighting device oriented toward the target. The elevation control signal is conducted by cable 32 through switch 84 (in the down position) to amplifier 86 and thereby causes a proportional displacement of the output member 49' of torque motor 48', which actuates the control valve 53' to create a displacement output from servomotor 60' in the manner described with respect to Fig. 3. Any other type of servomotor could be used, or it could be omitted entirely if the output of torque motor 48' is sufficiently powerful.

This displacement acts through a suitable rack and pinion arrangement 211 to rotate pulley 182 correspondingly. It will be clear that the rotation of pulley 182 thereby produced will be proportional to the control signal, and, accordingly, a torque will be applied by springs 184 to gyro ring 173 about axis 174 proportional to the elevation control signal. As is well-known, when a torque is applied about one axis of a gyro which is likewise unrestrained, its other axis is caused to precess at a velocity proportional to the applied torque. Accordingly, the torque applied about axis 174 causes a precession about axis 177 at a rate proportional to the applied torque and hence proportional to the elevation control signal derived from cable 32.

Hence, again we have a rate type of control whereby a fixed displacement of tracking control 18 will produce a proportional angular rate of change of the line of sight, represented in this instance by spin axis 172 or the sighting device coupled thereto. When the desired tracking condition obtains, it will be clear that the proper present target elevation data ($E_o$) are set into computing mechanism 1, since, as already described, follow-up ring 178 is caused to accurately follow the orientation of spin axis 172 and thereby sets in the proper elevation data into the computing mechanism 1. Also, since the angular rate of change of spin axis 172 is proportional to the torque applied about axis 174, and is therefore proportional to the angular displacement of pulley 182, it will be clear that this latter angular-displacement may be used directly to set in the elevation rate data ($E_r$) into computing mechanism 1. This is done by a suitable flexible shaft 212 coupled to pulley 182 by suitable gearing 213 and connected to the elevation rate data input shaft 11 of computing mechanism 1.

The azimuth control signal derived from manual control 17 is led by cable 42 through switch 43 (in the down position) to amplifier 44 which controls the torque motor 48 whose output member 49 actuates the control valve 55 and thereby creates a proportional displacement output from servomotor 60, in a manner similar to the elevation control system already described.

As was seen above, the azimuth control torque applied to gyro 170 is applied about axis 177 and creates precession about axis 174. Axis 174, however, does not remain vertical but remains constantly perpendicular to the spin axis 172. Accordingly, the motion of spin axis 172 in response to a torque about axis 177 is not motion in true azimuth but in what may be termed slant plane azimuth or azimuth in the slant plane, which plane is defined as the plane passing through axis 177 and containing the spin axis 172. From geometric considerations of this situation it follows that a change in slant plane azimuth of a given angular amount may be approximated by multiplying a change in true azimuth equal to the slant plane azimuth by the cosine of the angle of elevation which, of course, is the angle between the slant plane just mentioned and the horizontal plane.

It is desirable to have the control signal output of manual control device 17 represent the true azimuth rate. Accordingly, it is necessary to convert this true azimuth rate into slant plane azimuth rate before applying the corresponding torque about axis 177. This conversion is produced by a suitable three-dimensional cam 214 which is adapted to be rotated in accordance with the angle of elevation from shaft 194 of elevation follow-up motor 193 by means of elongated pinion 216 and to be axially translated in accordance with the desired true azimuth rate by means of piston 59 through rack and pinion arrangement 217, shaft 219, and rack and pinion arrangement 221. Cam 214 is so designed and constructed that the lift of its follower 222 for a given elevation and true azimuth rate input will represent the corresponding slant plane azimuth rate. This slant plane azimuth rate is led by a suitable rack and pinion arrangement 223, flexible shaft 224 and gearing 226 to torque pulley 186, and thereby applies a torque proportional to the desired slant plane azimuth rate about axis 177 and produces the required rate of change of spin axis 172 about axis 174 as already described.

As already described, the displacement of housing 60 is proportional to the true azimuth rate. Accordingly, this motion may be used to set in azimuth rate data (Ar) into computing mechanism 1. This is done by coupling the azimuth rate data input shaft 9 to shaft 219 by means of gearing 227. In this manner, by the usual rotation of handle bar 18, the operator may cause spin axis 172 to accurately track with the target and thereby sets into computing mechanism 1 the required orientation data and rate of change of orientation data. The range data (Do) may be supplied to computing mechanism 1 in the manner already described with respect to Fig. 1.

Instead of utilizing the displacement of tracking control 18 as true azimuth rate, it may be used as slant plane azimuth rate. In such a case, the output of servomotor 60 would be connected directly to flexible shaft 224 to control precessing of gyro 170, while the azimuth rate input shaft 9 of computing mechanism 1 would be actuated from the output of a three-dimensional cam similar to 214 but adapted to yield an output corresponding to true azimuth rate when actuated by elevation and slant plane azimuth rate data. Such a cam is called a secant cam since it serves to multiply slant plane azimuth rate by the secant of the elevation angle to produce true azimuth rate.

If desired, computing mechanism 1 may be modified to carry out its computations of gun aiming angles using slant plane data, which is later converted by a similar cam arrangement to the proper gun aiming angles referred to the horizontal, using true azimuth.

It should be clear from the above description that the line of sight defined by the spin axis of gyro 170 or the sighting device controlled thereby is stabilized. Thus, considering for the moment the condition where the target is fixed with respect to the earth and the sighting device is oriented toward it, it will be clear that spin axis 172 will remain oriented toward the target despite any changes in attitude of the craft (assuming its position also fixed with respect to the earth). Accordingly, the orientation of the sighting device with respect to the earth also remains fixed and toward the target. However, as the craft changes attitude, follow-up motors 193, 208 will operate to change the orientation of the sighting device with respect to the craft, thereby setting into computing mechanism 1 the proper orientation data with respect to the craft, as is necessary to maintain the sighting device and the gun turrets properly oriented toward the target as the craft changes attitude. Hence, no control action by the operator is necessary in this case. Where the target is moving with respect to the earth, the operator actuates his controls only to correct for changes in the target orientation with respect to the standard of position given by the gyro 170, without regard to any variations in attitude of the craft, which will have no effect upon his control or sighting arrangement. However, the data supplied to the computing mechanism will all be with respect to the craft, since bracket 179 and axis 177 are mounted on the craft, whereby angles of elevation and azimuth are measured with respect to the craft. Hence, the gun aiming angles (Eg) and (Ag) determined by computing mechanism 1 will again be taken with respect to the craft as the datum, and will provide proper indication or control for the guns. There is thus provided, in simpler fashion, a fully stabilized system similar in its results to that shown in Fig. 1.

In a manner similar to Fig. 1, the line of sight defined by spin axis 172 may be actuated from a remote control unit, such as that shown in Fig. 5 or of any other type, by throwing switches 43 and 84 to the up position, in which case amplifiers 44 and 86 are controlled by relative displacement between the orientation of the sighting device 124 and the computer setting as described with respect to Fig. 1, the manner of control being as just described with respect to Fig. 9.

However, this system has the same objection as the system of Fig. 1, namely, the actual line of sight of sighting device 124 is not stabilized. To overcome this difficulty, recourse is had to the system of Figs. 10A and 10B, taken jointly together. In this instance the sighting device 124 of Fig. 5 is illustrated as being a radio scanner 231 of the type disclosed in above-mentioned copending application Serial No. 441,188. As is described in this copending application, scanner 231 comprises a directive radiant energy transmitting device 232, whose directivity axis is caused to describe a cone during tracking operations. The axis of this cone is made to follow and track with a distant target, either by manual means or automatic means. For this purpose scanner 231 may be angularly displaced about a normally horizontal elevation axis such as 233 and a normally vertical azimuth axis such as 234, the motion about elevation axis 233 being under the control of a suitable elevation servo unit 236, and the motion about azimuth axis 234 being controlled by a suitable azimuth servo unit 237, these servos being shown in the present instance as each comprising a variable-displacement hydraulic transmission such as of the well-known Vickers type.

Fixed to scanner 231 and oriented therewith is a gyro 238 similar to gyro 170 of Fig. 9. Gyro 238 comprises a rotor spinning within a rotor housing 239 about an axis 241. Housing 239 is pivotally mounted within a ring 243 for rotation about an axis 242 perpendicular to axis 241. Ring 243, in turn is pivotally mounted within a further ring 246 fixed with respect to the scanner 231 for rotation about an axis 244, perpendicular to axis 242. Pivoted within ring 246 about an axis 247 perpendicular to axis 244 is a bail ring 248, containing an opening 249 through which passes a shaft 240 coaxial with the spin axis 241. In this way the bail ring 248 is made to rotate about axis 247 together with the spin axis 241. The use of bracket 246 fixed to scanner 231 assures that axis 244 remains perpendicular to the line of sight, and eliminates the necessity for ring 178 of Fig. 9, thereby effecting a great practical advantage and simplification in construction.

In operation, the spin axis 241 is suitably actuated to track with the desired target; that is, the orientation of spin axis 241 is made to coincide with the orientation of the desired target. This may be done by the use of manual tracking control device 17 actuated by tracking control 18 similar to that shown in Fig. 2. The elevation control signal thereby produced in the output cable 32 is led through switch 84 and a suitable amplifier 251 to a torque creating device or torquer 252, adapted to apply a torque to bail ring 248 about axis 247. Torquer 252 may be any suitable device adapted to create a torque corresponding in magnitude and sense to the magnitude and polarity or phase of the control signal voltage applied thereto. If desired, the torque producing means shown in Fig. 9 may be used, but preferably one of the well-known electromagnetic torque motors is used. Such motors may also be used in Fig. 9. The torque thus applied to bail ring 248 is transferred to the spin axis 241 by means of the opening 249, and thereby creates a torque on the gyro rotor about axis 242. This torque, as is well known, will create a precessing motion of spin axis 241 about the perpendicular axis 244, which motion thereby corresponds to a motion of the spin axis 241 in elevation.

In a similar fashion the azimuth control signal voltage produced in output cable 42 of tracking control 17 is led through switch 43 to a suitable amplifier 253, and thence to a second torque creating device 254, adapted to create a torque on ring 243 about axis 244. This torque therefore creates a precessing motion of spin axis 241 about axis 242. This motion corresponds to motion of spin axis 241 in slant plane azimuth, as described above. Accordingly, by suitable manipulation of handle bar control 18 the fire control officer may maintain the spin axis 241 oriented toward the distant target.

In order to determine when this condition obtains the scanner 231 is caused to track with the gyro 238; that is, the orientation of the axis of the conical scanning of the directivity axis of scanner 231 is maintained coincident with the orientation of the gyro spin axis 241. For this purpose suitable pick-offs such as those shown in Fig. 9, but indicated schematically at 256 and 257, are provided, which sense any relative displacement along two independent coordinates between the spin axis 241 and the scanner orientation. The resulting voltages produced in pick-offs 256 and 277 are conducted through respective elevation and azimuth amplifiers 258 and 259 to the respective control circuits 261 and 262 controlling the elevation and azimuth servos 236 and 237. Such pick-offs, amplifiers and controls are well known in the art and need not be further described here. In this manner any relative displacement between spin axis 241 and the orientation of scanner 231 is used to provide a correcting effect to re-orient the scanner orientation into coincidence with the spin axis 241.

In the manner described in the above-mentioned copending application Serial No. 441,188, periodic pulses of radiant energy are projected from the antenna 232, and pulses reflected from a distant object such as the desired target are received by antenna 232 and are led to a suitable radio receiver 263, as by means of high-frequency conductor 264. The output 266 of receiver 263 is conducted to a suitable cathode ray indicator 267 on whose screen the relative displacement between the target orientation and the scanner orientation is indicated, as described in copending application Serial No. 441,188. Since the scanner orientation is maintained coincident with the gyro spin axis 241, it will be clear that this indication also represents the relative displacement between the gyro spin axis 241 and the target orientation. Therefore in operation the fire control officer will manipulate the tracking control 18 in such a manner as to maintain the indicated error shown on indicator 267 at zero, in which case the gyro spin axis 241 and the scanner orientation are maintained coincident with the desired target orientation.

Suitably coupled to the elevation and azimuth axes 233 and 234 of scanner 231 are the elevation and azimuth self-synchronous position transmitters 268 and 269, which may be of any well-known type adapted to produce in their outputs 271 and 272 voltages corresponding to the relative angular positions in elevation and azimuth of the scanner 231. These position voltages are led to respective self-synchronous signal generators 273 and 274 which are adapted, as is well known, to produce in their outputs 276 and 277 voltages corresponding to the relative displacement between the respective elevation and azimuth components of the scanner orientation and the angular displacements of their respective input shafts 278 and 279, which are coupled respectively to the present target elevation data input shaft 6 and the present azimuth data input shaft 7. The signal voltages produced in outputs 276 and 277 of signal generators 273 and 274 are supplied to respective elevation and azimuth follow-up circuits 281 and 282 of any well-known type which operate to reduce these signal voltages to zero by rotating shafts 6 and 7 into correspondence with the elevation and azimuth components of the scanner orientation. Follow-ups 281, 282 may include any necessary or desirable amplifiers and/or anti-hunt and anti-lag devices. In this way the required present target elevation and azimuth data are supplied to computing mechanism 1.

As described above, the torque produced by torquers 252, 254 is preferably proportional to the currents applied thereto from amplifiers 251, 253, thereby producing proportional angular ratios of motion of spin axis 241 in elevation and azimuth. These currents may therefore be used to set the required rate data into computing mechanism 1. Thus, the elevation and azimuth control voltages produced in cables 32 and 42 by orientation control 17 are conducted, as by cables 283, 284, to the respective elevation and azimuth rate follow-up devices 286 and 287 adapted to produce an angular displacement of their output members corresponding in sense and magnitude to the phase or polarity and magnitude of these respective control voltages. It is to be understood that the follow-up devices 286 and 287 may include any necessary or desirable amplifiers and/or anti-hunt and anti-lag circuits. Their output members are connected respectively to the elevation and azimuth rate input members 11' and 9' of computing mechanism 1' and serve to introduce the elevation and azimuth rate data into the computing mechanism. As discussed relative to Fig. 9, the azimuthal motion of spin axis 241 is really in the slant plane. Hence the control signal produced in cable 284 and the resulting displacement of output shaft 9' of azimuth rate follow-up 287 correspond to slant plane azimuth rate. The true azimuth rate may be obtained by use of a three-dimensional cam similar to cam 214 of Fig. 9, but used inversely to obtain true azimuth rate data from slant plane azimuth rate data and elevation data. Such a cam is to be understood as included in the computing mechanism 1' of Fig. 10B.

Cables 283, 284 may alternatively be connected directly to torquers 252, 254. This is preferable, since then the possible distortion of the rate signals by amplifiers 251, 253 is avoided, and the input to rate data follow-up devices 286, 287 will correspond directly and exactly to the rates of precession of gyro 238.

If desired, computing mechanism 1' may carry out all its computing operations in the slant plane and then convert the results to the horizontal plane, as discussed relative to Fig. 9.

Accordingly, the required rate data and orientation data are provided for the computing mechanism 1'. Slant range data may be set into computing mechanism 1' in the same manner as in Fig. 1 or, alternatively, may be set in automatically in the manner shown in the above-mentioned copending application, Serial No. 441,188. Computing mechanism 1' thereby determines the proper gun aiming angles ($E_g$) and ($A_g$) which serve, through the self-synchronous transmitters 12 and 13 already described, to control or indicate the orientation of the guns and/or turrets.

It will be clear that here also the present target elevation and azimuth data set into computing mechanism 1 will be values determined with respect to the craft, since the voltages transmitted by the elevation and azimuth position transmitters 268 and 269 are also taken with respect to the craft. In addition, the scanner orientation is stabilized by means of gyro 238, and therefore will not experience the variations due to random change in craft attitude. Accordingly the only control required from the fire control officer or gunner will be that required by motion of the target relative to the earth without regard to the change in attitude of the craft. For this purpose the follow-up system between the gyro 238 and the scanner 231 should be made quick-acting in order that the scanner 231 may maintain coincidence with gyro 238 even during fairly rapid changes in attitude of the craft.

If desired, scanner 231 may be automatically oriented towards the target, in which case switches 43 and 84 will be thrown to their left or "automatic" position, in which torquers 252 and 254 are controlled from receiver 263, by means of respective amplifiers 288 and 289, as shown in the above-mentioned copending application Serial No. 441,188. In this type of operation, the scanner orientation is automatically aligned with the target orientation whereby present target elevation and azimuth data are automatically set into computing mechanism 1'. In addition, any change in target orientation with respect to scanner orientation serves to produce signals output from amplifiers 288 and 289, which are fed to the torquers 252 and 254 to realign spin axis 241 toward the target and, hence, to realign scanner 231 with respect to the target. The rate at which the spin axis 241 moves is therefore determined by the rate at which the target is moving with respect to the scanner orientation, and accordingly the voltages required by the torquers 252 and 254 will be proportional to this rate, along the elevation and slant plane azimuth components. Hence, the voltages fed to the rate follow-up devices 286 and 287 are proportional to the actual target rate components and therefore supply computing mechanism 1' with the required elevation and slant plane azimuth rate data in a manner similar to the manual control already described. Indicator 267 in this instance merely serves as a monitor to show proper operation of the system.

If desired, the apparatus of Figs. 10A and 10B may be used with a local optical sighting device, whose azimuth control shaft 295 is coupled directly to the target present azimuth data input shaft 7 by way of gearing 291 and 292, and whose elevation control shaft 296 is coupled to the present target elevation data input shaft 6 by way of gearing 293 and 294. These shafts 295 and 296 control the orientation of line of sight 69' in a manner similar to that described for controlling the line of sight 69 in connection with Fig. 1.

When using visual tracking with this local optical sighting device, the operator will manipulate tracking control member 18 to maintain the target image centralized with respect to a suitable reference index in the sighting device. By so doing, he operates gyro 238 and scanner 231 as well as computing mechanism 1' in exactly the same manner as during manual tracking by means of indicator 267, but relying instead upon visual sighting to show the desired tracking condition. The sighting device 10', however, will still be stabilized by the action of gyro 238 in the manner already described, since it is coupled to data input shafts 6, 7.

If desired, scanner 231 and gyro 238 may be located together with computing mechanism 1' and manual control 18, instead of remotely as shown. In such case, follow-ups 281 and 282 may be replaced by direct mechanical connections between scanner 231 and data input shafts 6 and 7.

It is to be understood that any or all the servos and follow-up devices used herein may be provided with well-known anti-hunt and anti-lag devices.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. Fire control apparatus for aircraft comprising a sighting device mounted on said aircraft, means for tracking said sighting device with a target comprising means for actuating said device at a rate corresponding to the angular velocity of said target and means for further actuating said device in accordance with the relative changes in attitude of said craft, whereby actuation by said first actuating means necessary to maintain said sighting device in track with said target is unaffected by changes in attitude of said craft, means coupled to said sighting device for setting target position data into a computing mechanism adapted to determine correct gun aiming angles when set in accordance with the target position data and target rate data, and means responsive to said first actuating means for setting in rate data to said computing mechanism.

2. An aircraft gun sight and computer system comprising a target position data shaft and a target rate data shaft adapted to supply target position and rate data to a computer for determining gun aiming angles when said shafts are respectively set in accordance with data representing the position and apparent angular velocity of a target, means including sighting means for seting said position data shaft in accordance with the present position of a target, a gyroscope flexibly restrained about a first axis, means for rotating said gyro about a second axis by said position data shaft, means operated by said gyroscope for producing a differential pressure corresponding to the precession of said gyro about said first axis, the flexible restraint of said gyro about said first axis including linear force exerting means controlled by said pressure for restraining said gyro from precessional displacement, and means for actuating said rate data shaft in accordance with the displacement of said force exerting means.

3. An aircraft gun sight and computer system, comprising a target position data shaft and a target rate data shaft adapted to supply target position and rate data to a computer for determining gun aiming angles when said shafts are respectively set in accordance with data representing the position and velocity of a target, means including sighting means for setting said position data shaft in accordance with the present position of a target, a gyroscope flexibly restrained about a first axis, means for rotating said gyro about a second axis by said position data shaft, and means for setting said rate data shaft by precession of said gyro about said first axis.

4. An aircraft sight and computer system comprising a target position data shaft and a target rate data shaft adapted to supply target position and rate data to a computer for determining gun aiming angles when said shafts are respectively set in accordance with data representing the position and velocity of a target, means including sighting means for setting said position data shaft in accordance with the present position of a target, a gyroscope flexibly restrained about a first axis, means for rotating said gyro about a second axis by said position data shaft, and means responsive to the torque exerted by the said gyro about said first axis for setting said rate data shaft proportionally to the rate of movement of said target position data shaft.

5. An aircraft gun sight and computer system comprising a target position data shaft and a target rate data shaft adapted to supply target position and rate data to a computer for determining gun aiming angles when said shafts are respectively set in accordance with data representing the position and velocity of a target, means including sighting means for setting said position data shaft in accordance with the present position of a target, and a rate gyro responsive to setting of said position data shaft for setting said rate data shaft in accordance with the apparent angular velocity of said target.

6. A rate of turn responsive device comprising a rotatable platform, a gyroscope having a rotor pivotally mounted about an axis parallel to said platform within a bracket fixed to said platform whereby rotation of said platform is transmitted to said gyro rotor, a pilot valve controlled by motion of said rotor about said axis for producing a differential pressure corresponding in magnitude and sense to the magnitude and sense of displacement of said rotor about said axis, a control cylinder having a displaceable piston responsive to said pressure, and spring means actuated by said piston for applying a torque proportional to the displacement of said piston to said rotor to oppose said rotor displacement, whereby said rotor is restrained from displacement and the displacement of said piston gives a measure of the torque produced by said rotor and hence a measure of the rate of turn of said platform.

7. Fire control apparatus comprising a free gyroscope, a sight, means responsive to positional displacement between said sight and said gyroscope for causing the spin axis of said gyroscope to track with a target, and means for controlling a computing mechanism from said gyro for determining gun aiming angles for engaging the target.

8. Stabilized gyroscopic tracking apparatus comprising a sighting device defining a line of sight, a free gyroscope, means for maintaining said line of sight in coincidence with the spin axis of said gyro, and means for tracking said line of sight with a target, comprising means for producing signals corresponding to the necessary azimuth and elevation rates of change of said line of sight to maintain said line oriented toward said target, means for producing torques respectively proportional to said elevation rate and azimuth rate signals, means for converting said azimuth rate torque to a torque corresponding to azimuth rate in the slant plane containing said line of sight, and means for applying said elevation and slant plane azimuth torques to respective axes of said gyro to cause said spin axis to precess, whereby the orientation of said spin axis corresponds to the orientation of said target, and said torques correspond respectively to the azimuth and elevation rates of motion of said target.

9. Stabilized gyroscopic tracking apparatus for tracking with a target comprising a free gyroscope having a spin axis, means for producing signals corresponding to the azimuth and elevation rates necessary to maintain said axis oriented toward said target, means for converting said azimuth rate signal to a signal corresponding to azimuth rate in the slant plane containing said axis and perpendicular to the vertical plane containing said axis, means responsive to said signals for producing torques respectively proportional to said elevation rate and slant plane azimuth rate signals, and means for applying said torques to respective axes of said gyro to cause said spin axis to precess, whereby the orientation of said spin axis corresponds to orientation of said target, and said torques correspond respectively to the azimuth and elevation rates of motion of said target.

10. Stabilized gyroscopic tracking apparatus for tracking with a target comprising a free gyro having a spin axis precessible in elevation about a horizontal axis perpendicular to said spin axis and in slant plane azimuth about an axis perpendicular to both said spin and horizontal axes, means for producing a signal corresponding to the azimuth rate of said spin axis necessary to maintain said axis oriented toward said target, means for producing a torque corresponding to said azimuth rate signal, means for converting said azimuth rate torque to a torque corresponding to slant plane azimuth rate, and means for applying said converted torque to said gyro about said horizontal axis to precess said spin axis in slant plane azimuth, whereby the orientation of said spin axis corresponds to the orientation of said target and said signal corresponds to the angular velocity of said target in azimuth.

11. Stabilized fire control apparatus comprising an orientable radio scanning device, radio means for automatically producing signals corresponding to relative displacement between the orientation of said device and the orientation of a target, a free gyro having a horizontal gimbal axis and a second gimbal axis perpendicular thereto, means actuated by said radio means for applying torques proportional to said signals to said axes to cause the spin axis of said gyro to track with said target, and follow-up means controlled by said gyro for maintaining the orientation of said scanning device in correspondence with said spin axis, whereby said scanning device tracks with said target.

12. Stabilized fire control apparatus as in claim 11, further including a target rate device for supplying target rate data to a computer and means for actuating said device by said signals.

13. Stabilized fire control apparatus as in claim 11, further including a target rate device and a target orientation device for supplying target rate and orientation data to a computer, means for actuating said rate device by said signals, and means for actuating said orientation device in correspondence with the orientation of said scanning device.

14. Stabilized fire control apparatus comprising an orientable radio scanning device, radio means connected to said scanning device for automatically producing signals corresponding to relative displacement between the orientation of said scanning device and the orientation of a target, a free gyro having a spin axis, said gyro controlling the position of said scanning device, means responsive to said signals for precessing said axis at a rate corresponding to the angular velocity of said target for causing said gyro and said scanning device to track the target, a rate device for supplying rate data to a computer, and means for actuating said rate device in response to said signals.

15. Stabilized fire control apparatus as in claim 14, wherein said apparatus further includes a target orientation device and means for actuating said orientation device in correspondence with the orientation of said spin axis.

16. Apparatus for measuring the rate of turn of an object, comprising an object turnable about an axis, a free gyro turnable about a corresponding axis, and means responsive to turning movements of said object relative to said gyro for applying a torque to said gyro for precessing said gyro to turn in a direction to follow movement of said object, the magnitude of said torque providing a measure of the angular rate of turn of said object about said axis.

17. Apparatus for measuring the rate of turn of an object turnable about an axis, a free gyro turnable about a corresponding axis, means responsive to turning movements of said object relative to said gyro for applying torque to said gyro for precessing said gyro to turn in a direction to follow movement of said object, and means responsive to said last-named means for obtaining a measure of said torque to provide a measure of the angular rate of turn of said object about said axis.

18. A stabilized radio control system, comprising a gyro element, means for receiving energy radiated by a target, the position of said means being controlled by and in accordance with the position of said element, and means responsive to said receiving means for causing said gyro element to follow movements of said target.

19. A stabilized radio control system, comprising means for receiving energy radiated by a target, a gyro element, mechanism controlled by said element for positioning said receiving means in accordance with the position of said element, and means responsive to said energy for causing said gyro element to follow movements of said target.

20. A stabilized radio control system comprising a gyro element, means for receiving energy radiated by a target, the position of said means being controlled by and in accordance with the position of said element, mechanism for positioning an optical sight in accordance with position of said element, and means responsive to said receiving means for causing said element to follow movements of said target.

21. A stabilized radio control system, comprising a gyro element, means for receiving energy radiated by a target, the position of said means being controlled by and in accordance with the position of said element, means responsive to said receiving means for directing said gyro element toward said target, manually operable means for directing said gyro element toward said target, and means for selectively connecting said gyro element to said receiving means or said manually operable means.

22. In a stabilized fire control system for computing gun sights, including a member oriented toward the target, a three degree of freedom gyroscope mounted on said member, manually operable tracking means for applying a controllable torque on one axis of the gyroscope to secure a desired rate of precession thereof to follow a target, pick-off means interposed between said member and said gyroscope to be actuated by relative movement thereof, follow-up means controlled by said pick-off means for causing the member to follow the gyroscope and target, and means actuated by said torque means for introducing into a computer a prediction factor proportional to angular rate for determining gun aiming angles which is a function of said torque.

23. Fire control apparatus comprising a target position data device and a target rate data device adapted to supply target position and rate data to a computer for determining correct gun aiming angles for engaging a target when said devices are actuated in accordance with the present position and velocity of said target, a free gyroscope, a remote sighting device, torque creating means controlled by said sighting device for precessing the spin axis of said gyro to follow movements of said sighting device at a rate proportional to said torque, means for controlling said position data device from the orientation of said spin axis, and means for controlling said rate data device in accordance with said torque.

24. In a stabilized sighting system, a movably supported sighting device, a gyroscope gimbal mounted on said sighting device, pick-off means interposed between said device and said gyroscope to be actuated by relative movement thereof, power means controlled by said pick-off means for maintaining said sighting device in fixed relation to said gyroscope, and means for applying a controllable torque to precess said gyroscope for causing said sight to move at a rate dependent upon said torque.

CARL G. HOLSCHUH.
EDMUND B. HAMMOND, Jr.
WALTER T. WHITE.

References Cited in the file of this patent

UNITED STATES PATENTS

| Number | Name | Date |
| --- | --- | --- |
| 1,031,769 | Barr et al. | July 9, 1912 |
| 1,831,597 | Henderson | Nov. 10, 1931 |
| 1,834,341 | Henderson | Dec. 1, 1931 |
| 2,027,349 | Seversky | Jan. 7, 1936 |
| 2,339,508 | Newell | Jan. 18, 1944 |

FOREIGN PATENTS

| Number | Country | Date |
| --- | --- | --- |
| 188,648 | Switzerland | Apr. 1, 1937 |
| 616,248 | Germany | Aug. 1, 1935 |